March 28, 1933.　　　　F. JOHN　　　　1,903,049
ROTARY KEY CLUTCH
Filed March 11, 1927　　　　3 Sheets-Sheet 1
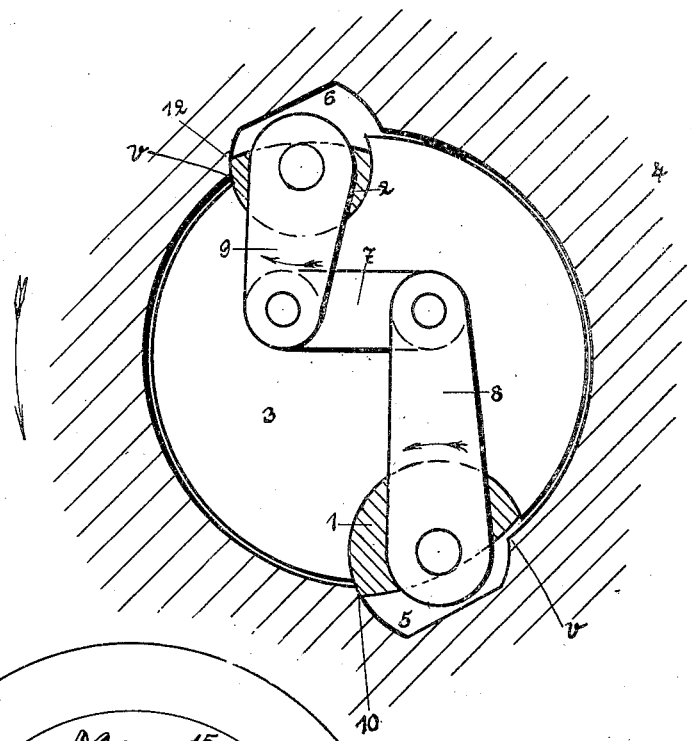
Fig. 1.
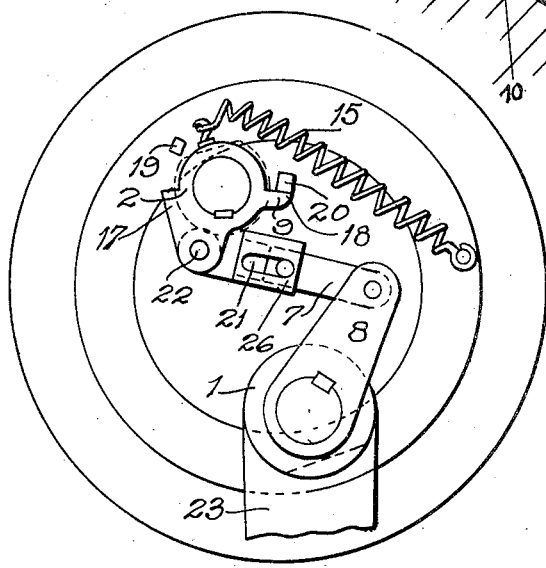
Fig. 5.ª
F. John
INVENTOR
By: Marks & Clerk
ATT'YS March 28, 1933.　　　F. JOHN　　　1,903,049
ROTARY KEY CLUTCH
Filed March 11, 1927　　　3 Sheets-Sheet 2
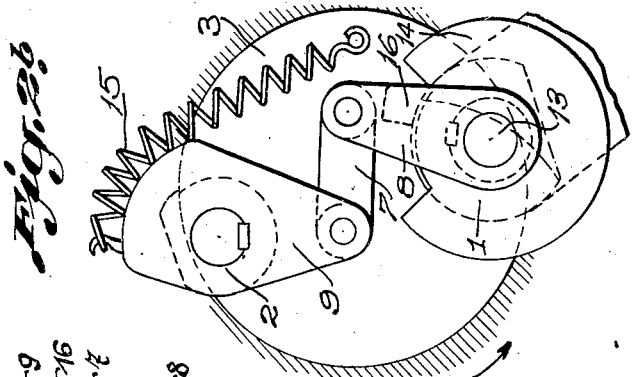
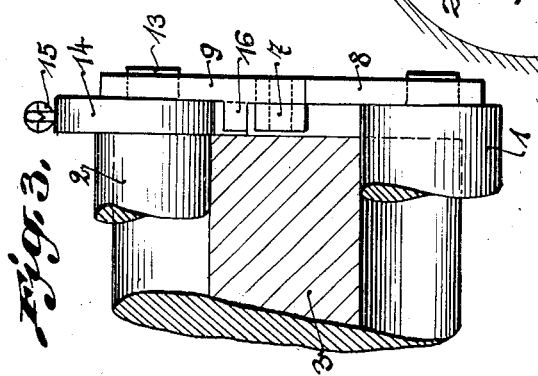
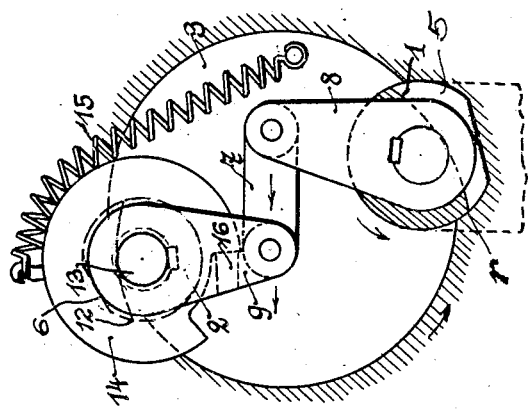
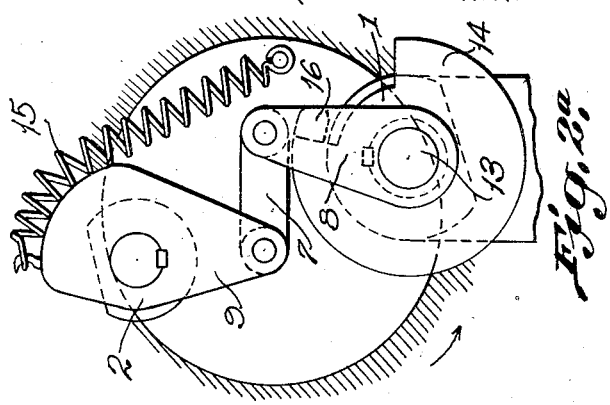
F. John
INVENTOR
By: Marles & Clerk
Attys.

March 28, 1933.   F. JOHN   1,903,049
ROTARY KEY CLUTCH
Filed March 11, 1927   3 Sheets-Sheet 3

F. John
INVENTOR

By: Marks & Clerk
Attys.

Patented Mar. 28, 1933

1,903,049

UNITED STATES PATENT OFFICE

FERDINAND JOHN, OF DUSSELDORF-OBERKASSEL, GERMANY

ROTARY KEY CLUTCH

Application filed March 11, 1927, Serial No. 174,614, and in Germany November 23, 1925.

Rotary key clutches comprises, besides the driving element which serves for clutching, the rotary key, a locking element which is likewise constructed as a rotary key or as a locking pawl of any kind. For the present invention, neither the form of the driving element nor the form of the locking element is of importance.

The locking element is intended to prevent the driven shaft from running ahead of the driving wheel, which is possible, for example, in the case of eccentric presses, owing to the intrinsic weight of the press plunger. A condition for this is that the locking element can pass into the locking position at least at the same time as the rotary key passes into the engaging position for coupling. On this ground, with the known rotary key clutches, the driving key and the locking element are brought by various means into such dependence upon one another that the driving key, during its own passage into the clutching position, transfers the locking element into the locking position or releases a lock that holds fast the locking element, so that the latter can pass into the locking position under the action of a spring.

The driving key, in the event of the position of the parts at the time of engagement being unfavourable, does not always enter fully into its abutment (recess) in the hub of the driving wheel. At times it springs with its edge only so far into the abutment that the shaft and the driving wheel are only just coupled together. In this case the locking element does not enter its abutment at all so that it cannot prevent the shaft from running ahead. The consequence is that the press slide block falls down and the workman in charge of the machine and the machine itself are endangered.

The failure of the locking element under the circumstances described may be explained in the case of the older methods of coupling by:—(1) the kind of connection between the driving key and the locking element, which allows the locking element to have less or only the same movement as the driving key has; (2) the necessary play in the joints and pivots, without which the parts would be too difficult to move, and (3) the natural wear of the edges and rubbing surfaces.

On these grounds, according to the invention, provision is made for guarding against failure of the locking element by transmitting the movement of the driving key to the locking element with a multiplication of speed. A small snapping movement of the driving key, which is just sufficient to take the shaft with it, therefore results in such a great deflection of the locking element that the latter passes far enough into the locking position and thereby prevents reliably the dangerous over-running of the shaft and of the press plunger, and of the stamping, pressing and other tools driven thereby.

The positive connection between the driving key and the locking element is preferably established by a lever connection. The driving key and the locking element are each provided with a lever arm, and the two lever arms are connected with one another by a link. In order to ensure the prescribed action of the locking element, according to the invention the connection formed by the driving key, the locking element and the lever mechanism that transmits the motion is provided at one point with a lost-motion connection which is bridged over in the direction of the engaging movement to form a closed circuit by means of a spring. Consequently, after the beginning of the engaging movement of the driving key, the locking element moves, independently of the driving key, owing to a closing force (spring), into the next engaging recess that presents itself. On the other hand during or after the beginning of the disengaging movement of the driving key, the locking element is disengaged from the driving key by the lever connection itself. Owing to this arrangement, in conjunction with the lever speed-multiplying transmission gear previously described, the dangerous overrunning of the driving wheel by the shaft is reliably prevented, and the complete closing of the clutch is also ensured when the driving key has only just engaged the edge of the recess in the driving wheel.

The invention is illustrated in various constructional forms in the accompanying drawings, wherein:

Fig. 1 is a diagrammatic front view partly in section of a rotary clutch constructed in accordance with the invention.

Fig. 2 is a similar view of a modification of the invention.

Figs. 2a and 2b are views similar to Fig. 2 showing the various positions of the parts.

Fig. 3 is a fragmentary detail section taken at right angles to Fig. 2 showing fragments of the driving key and locking element and the associated parts.

Fig. 5a is a fourth embodiment similar to the construction shown in Figs. 4 and 5, showing a further modification of this embodiment.

Figure 4:
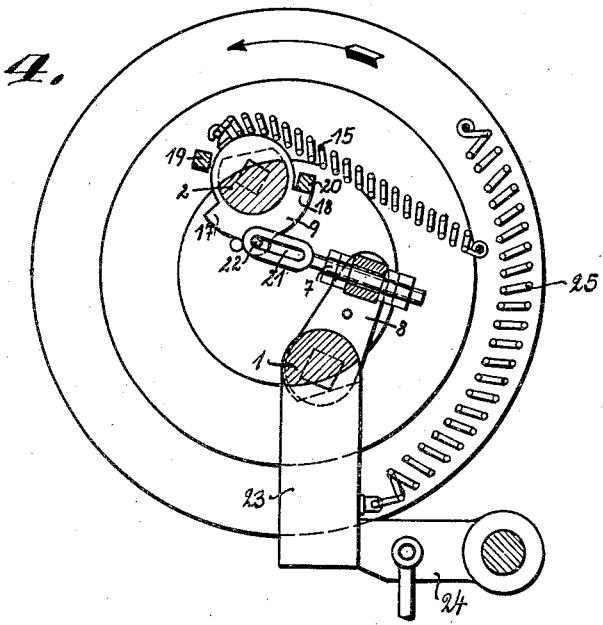
Figs. 4 and 5 are diagrammatic side views of a third modification of the invention, showing the parts in their various positions.

According to Fig. 1 opposite to the driving key 1, is arranged the locking element 2, likewise constructed as a rotary key. In the wheel body 4 surrounding the shaft 3 are located the notches or abutments 5 and 6. The two rotary keys 1 and 2 are connected by a link 7, which is pivoted to arms 8 and 9, of the two rotary keys.

A speed multiplying transmission from the driving key 1 to the locking key 2 is obtained by making the lever arm 8 of the driving key longer than the lever arm 9 of the locking key. If the edge 10 of the driving key 1 has only just engaged the edge r of the recess 5, the edge 12 of the locking key 2 has already penetrated more or less deeply into the recess 6 according to the difference between the lengths of the levers. By suitably selecting the velocity ratio this certainty may be made as great as is desired.

Furthermore in the case of the smallest movement of the driving key, the locking key must engage in the locking position as soon as a recess comes opposite to it. This involves the locking key being able to engage independently of the driving key, and yet being constrained to engage, if the driving key begins its movement, as soon as an opportunity presents itself. This requirement is met by the constructional form illustrated in Figs. 2, 2a, 2b and 3. On to the driving key 1 is keyed the lever arm, while the lever arm 9 is so mounted as to be freely rotatable upon the pivot 13 of the locking key 2. The two lever arms 8 and 9 are pivotally connected with one another by a link 7. On the locking key 2 is fixedly arranged a tappet plate 14, which bears with one edge against a projection 16 on the lever arm 9. This is effected by the spring 15, which connects the tappet plate 14 with the shaft 3.

When the driving key 1 is rotated for the purpose of closing the clutch, the lever arm 8 rotates towards the left in Figure 2, and by the link 7 the lever arm 9 rotates in a clockwise direction. Now as soon as a recess in the hub of the driving wheel comes opposite to the locking key 2, the spring 15 rotates the tappet plate 14 and the locking key 2 in the same direction until the edge of the tappet plate 14 again strikes against the projection 16 on the lever arm 9, that is to say, until the locking key is engaged, and does so the more, the greater the transmission ratio occasioned by the two lever arms 8 and 9. Thus when the driving key 1 is only engaged a little, or the edge of the driving key 1 is mounted just on the edge of the wheel hub, the locking key, in consequence of the lever transmission ratio provided, can enter so deeply into its recess, that overrunning of the shaft and throwing down of the press slide block are impossible.

If the driving key 1 does not make its full engaging movement all at once but gradually or in stages, the locking key 2 follows this movement on a scale magnified by the lever transmission ratio.

According to Figure 2 the lost motion in the positive connection is located in the lever connection between the edge of the tappet plate 14 and the projection 16 of the lever arm 9, the tappet plate being resiliently urged to follow the said projection by the spring 15. This lost motion, which makes the engaging movement of the locking key 2 independent of that of the driving key 1, may equally well be located between the driving key 1 and its lever arm 8 as shown in Figures 2a and 3b, in which case the lever arm 9 must be keyed to the pivot 13 of the locking key 2.

Figure 5:
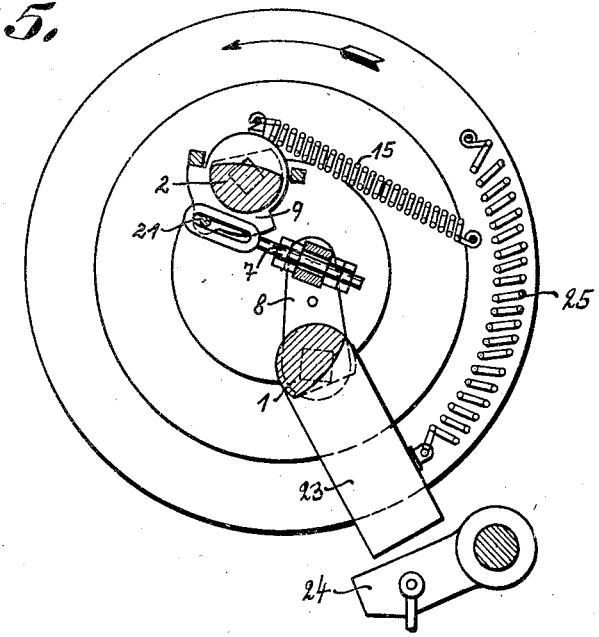

A further constructional example of the clutch is shown in Figures 4 and 5, Figure 4 showing it in a disengaged and Figure 5 in an engaged position. Here the lever arm 9 is rigidly connected with the locking key 2 and is rotated by a spring 15 in a clockwise direction. It can bear alternatively with the two projections 17 and 18 against stroke-limiting stops 19 and 20. The link 7 is provided with a slot 21, in which the link pin 22 of the lever arm 9 is slidable. The slot 21 makes the engaging movement of the locking key 2 independent of that of the driving key 1. The driving key 1 is held fast by the arm 23, and this by the locking lever 24, which is rotated out of the locking position by hand or by a treadle. As soon as the locking lever 24 releases the arm 23, the latter is rocked over by the spring 25, as shown in Figure 5, and the driving key 1 is thereby engaged in its abutment for clutching.

Instead of providing the link with a slot it may be constructed in two parts 7 and 26, as shown in Figure 5a, the two parts being slidable relatively to one another and actuated by a spring 15.

The positive connection illustrated between the driving key and the locking key has the further result that the locking key is brought back into the normal position simultaneously with the driving key and by the latter, that is, it does not require to be brought back by the driving wheel. Avoidance of shock, and diminished wear, are the results of this arrangement.

What I claim is:—

1. A rotary key clutch comprising a driving member, a driven member, and a driving key for establishing and interrupting a driving connection between said driving member and said driven member, a locking member for the driven member, and elements connecting the driving key with the locking member, said elements being adapted to transmit motion from the driving key to the locking member with increased amplitude.

2. A rotary key clutch comprising a driving member, a driven member and a driving key for establishing and interrupting a driving connection between said driving member and said driven member, a locking member for the driven member, a lever arm on the driving key, a lever arm on the locking member, said levers being so connected with one another as to form, with the driving key and the locking member, a positive connection, a lost motion connection in said positive connection, said positive connection being adapted to transmit motion from the driving key to the lost motion connection with increased amplitude, means for bridging over said lost-motion connection in the direction for closing the clutch, said means being adapted, after the commencement of an engaging movement of the driving key, to cause the locking member to move, independently of the driving key, into the next engaging recess in the driving wheel that presents itself, but to disengage the locking member by means of the lever connection itself upon the commencement of a disengaging movement of the driving key.

3. A rotary key clutch comprising a driving member, a driven member and a driving key for establishing and interrupting a driving connection between said driving member and said driven member, a locking member for the driven member, a lever arm on the driving key, a lever arm on the locking member, said levers being so connected with one another as to form, with the driving key and the locking member, a positive connection, a lost-motion connection in said positive connection, said positive connection being adapted to transmit motion from the driving key to the lost-motion connection with increased amplitude, a spring for bridging over said lost-motion connection in the direction for closing the clutch, said spring being adapted, after the commencement of an engaging movement of the driving key, to cause the locking member to move, independently of the driving key, into the next engaging recess in the driving wheel that presents itself, but to disengage the locking member by means of the lever connection itself upon the commencement of a disengaging movement of the driving key.

4. A rotary key clutch comprising a driving member, a driven member, and a driving key mounted upon one of said members for establishing and interrupting a driving connection between said driving member and said driven member, the other of said members being formed with a recess adapted to form an abutment for said driving key, a locking member mounted upon one of said members, and the other of said members being formed with a recess adapted to form an abutment for said locking member adapted to prevent the driven member from overrunning the driving member, and elements adapted to transmit motion with increased amplitude from the driving key to the locking member to set said locking member free to move into the locking position when the driving key moves into the clutching position, the movement which the locking member is permitted to execute being of greater amplitude than the movement of the driving key.

5. A rotary key clutch comprising a driving member, a driven member, and a driving key mounted upon one of said members for establishing and interrupting a driving connection between said driving member and said driven member, the other of said members being formed with a recess adapted to form an abutement for said driving key, a locking member mounted upon one of said members, and the other of said members being formed with a recess adapted to form an abutment for said locking member adapted to prevent the driven member from overrunning the driving member, and elements adapted to set said locking member free to move into the locking position when the driving key moves into the clutching position, the movement which the locking member is permitted to execute being of greater amplitude than the movement of the driving key.

6. A rotary key clutch comprising a driving member, a driven member, and a driving key mounted upon one of said members for establishing and interrupting a driving connection between said driving member and said driven member, the other of said members being formed with a recess adapted to form an abutment for said driving key, a locking member mounted upon one of said members, and the other of said members being formed with a recess adapted to form an abutment for said locking member, and elements connecting the driving key with the locking member, said elements being adapted to transmit motion from the driving key to the locking member with increased amplitude.

7. A rotary key clutch comprising a driving member, a driven member, and a driving key mounted upon one of said members for establishing and interrupting a driving connection between said driving member and said driven member, the other of said members being formed with a recess adapted to form an abutment for said driving key, a locking member mounted upon one of said members, and the other of said members being formed with a recess adapted to form an abutment for said locking member adapted to prevent the driven member from overrunning the driving member, and elements adapted to transmit motion with increased amplitude from the driving key to the locking member to set said locking member free to move into the locking position when the driving key moves into the clutching position.

8. A rotary key clutch comprising a driving member, a driven member, and a driving key mounted upon one of said members for establishing and interrupting a driving connection between said driving member and said driven member, the other of said members being formed with a recess adapted to form an abutment for said driving key, a locking member mounted upon one of said members, and the other of said members being formed with a recess adapted to form an abutment for said locking member, and elements connecting the driving key with the locking member, said elements being adapted to transmit motion from the driving key to the locking member with increased amplitude.

9. A rotary key clutch comprising a driving member, a driven member, and a driving key mounted upon one of said members for establishing and interrupting a driving connection between said driving member and said driven member, the other of said members being formed with a recess adapted to form an abutment for said driving key, a locking member mounted upon one of said members, and the other of said members being formed with a recess adapted to form an abutment for said locking member adapted to prevent the driven member from overrunning the driving member, elements adapted to set said locking member free to move into the locking position when the driving key moves into the clutching position, the movement which the locking member is permitted to execute being of greater amplitude than the movement of the driving key and elements positively connecting the driving key and the locking member with one another so that both the keys return to the released position together.

10. A rotary key clutch comprising a driving member, a driven member, and a driving key mounted upon one of said members for establishing and interrupting a driving connection between said driving member and said driven member, the other of said members being formed with a recess adapted to form an abutment for said driving key, a locking member mounted upon one of said members, and the other of said members being formed with a recess adapted to form an abutment for said locking member, and elements connecting the driving key with the locking member, said elements being adapted to transmit motion from the driving key to the locking member with increased amplitude.

In testimony whereof I have signed my name to this specification.

FERDINAND JOHN.